(12) United States Patent
Simon et al.

(10) Patent No.: US 6,854,785 B2
(45) Date of Patent: Feb. 15, 2005

(54) EQUIPMENT MODULE FOR A MOTOR VEHICLE OPENING PANEL

(75) Inventors: Laurent Simon, Montigny le Bretonneux (FR); Jean-Pierre Eustache, Antony (FR)

(73) Assignee: Valeo Systemes d'Essuyage (FR)

( * ) Notice: Subject to any disclaimer, the term of this patent is extended or adjusted under 35 U.S.C. 154(b) by 19 days.

(21) Appl. No.: 10/275,644

(22) PCT Filed: May 4, 2001

(86) PCT No.: PCT/FR01/01361

§ 371 (c)(1),
(2), (4) Date: Nov. 7, 2002

(87) PCT Pub. No.: WO01/85477

PCT Pub. Date: Nov. 15, 2001

(65) Prior Publication Data

US 2004/0041438 A1 Mar. 4, 2004

(51) Int. Cl.[7] .................................................. B60J 5/00
(52) U.S. Cl. .................................................. 296/146.7
(58) Field of Search ........................... 296/146.7, 146.8; 49/502, 503, 514

(56) References Cited

U.S. PATENT DOCUMENTS

| | | | |
|---|---|---|---|
| 3,592,504 A | | 7/1971 | Sandor |
| 5,574,443 A | | 11/1996 | Hsieh |
| 5,584,144 A | * | 12/1996 | Hisano .................... 296/146.7 |
| 6,019,418 A | | 2/2000 | Emerling et al. |
| 6,123,384 A | * | 9/2000 | Eustache et al. .............. 49/502 |
| 6,546,674 B1 | * | 4/2003 | Emerling et al. ........ 296/146.7 |
| 2002/0095870 A1 | * | 7/2002 | Praud et al. .................. 49/502 |

FOREIGN PATENT DOCUMENTS

| | | |
|---|---|---|
| EP | 0 495 712 | 7/1992 |
| EP | 0 773 126 | 5/1997 |

\* cited by examiner

Primary Examiner—Lori L. Coletta
(74) Attorney, Agent, or Firm—Young & Basile, P.C.

(57) ABSTRACT

The invention concerns an equipment module (22) for a motor vehicle opening panel (12) comprising in particular an interior door trim element (42) and an outer cladding (14) comprising a structural element (20) whereon are directly mounted accessories internal to the opening panel (12), characterized in that the structural element (20) consists of the inner door trim (42).

23 Claims, 3 Drawing Sheets

EQUIPMENT MODULE FOR A MOTOR VEHICLE OPENING PANEL

BACKGROUND

This invention concerns an equipment module for a motor vehicle opening panel comprising a structural element on which accessories internal to the opening are directly mounted.

Numerous accessories can be attached onto the opening panel of a motor vehicle, in particular on the rear hatchback. In that way, the opening panel can support, in addition to its closing and locking system, an electric motor.

When the opening panel is the rear hatchback of the vehicle, the electric motor allows control of a wiper. The rear hatchback can also support positioning means, in a parked position, a wiper arm, a license plate, and lighting systems, but also, eventually the third required "brake" light, or even all or part of the rear signal light blocks.

When the opening panel is a door of the vehicle the electric motor can allow the control of the movement of raising and lowering a window.

All the accessories, which are naturally produced independent of the body piece that makes up the opening panel, must thus be mounted on this opening panel during the assembly of the vehicle. Yet the multiplication of accessories creates an increase of mounting time and multiplies the risks of mounting error, in particular positioning.

In addition, it is necessary to allow for each of the electric accessories, first the electric power supply and, second, means to control these accessories, and finally surveillance means that allow, in particular, one to be informed of the functioning state of the accessories either by the driver, for example via the intermediary of warning lamps on the dashboard, or by a central electronic management unit of the vehicle.

These multiple connections, for which it is necessary to provide on the assembly line of the vehicle, are possible sources of breakdown and it is thus necessary to verify them after assembly.

As one can state, the multiplication of the electric accessories borne by an opening panel of the vehicle can lead to a significant increase in the total assembly time of this opening panel.

It is common knowledge how to assemble accessories on the structural element then to attach this structure onto the corresponding opening panel. Next an interior door trim element covers the structural element in order to hide it. This necessitates a number of significant operations.

SUMMARY

With the goal of diminishing the assembly time as well as the number of elements to be assembled, the invention proposes an equipment module for a motor vehicle opening panel comprising, in particular, an interior door trim element and an outer cladding of the type that comprises a structural element on which internal accessories are mounted to the opening panel, characterized in that the structural element is made up of the interior door trim element.

According to other characteristics of the invention:

the interior door trim element is made of an electric isolating material and is molded around at least one lead or cable in an electrically conductive material for the electric power supply, at least one accessory borne by the interior door trim element, or for the exchange of signals with this element;

the module comprises at least one electric power supply connector of the module the body of which is molded with the interior door trim element and which is linked electrically to a first end of at least one electric power supply lead;

the module comprises only one power supply connection for all the electric power supply leads of the module;

the module comprises at least one electric power supply connection of at least one accessory the body of which is molded with the interior door trim element and which is electrically linked to a second end of at least one electric power supply lead of at least one accessory;

the module comprises at least one assembly and/or mounting element of at least one accessory which is molded with the interior door trim element;

one of the accessories comprises a light source;

the light source comprises a rear signal light, in particular, a brake signal light, a turn signal, a reverse light, or an anti-fog light, or part of such a light;

the rear signal light is pushed against the interior face of a rear window borne by a rear opening panel of the motor vehicle, in particular, with interposition of a joint or pushes against the curve of the opening of an outer cladding;

the interior door trim element comprises means of regulating the position of the rear signal light in relation to the interior face of the rear window or of an opening of an outer cladding of an opening panel;

the light source comprises a lighting block for the exterior of the vehicle, such as a light block of the license plate;

an accessory comprises a drive motor of a wiper device;

an accessory comprises a control element of the opening panel, such as a handle;

an accessory comprises a locking element of the opening;

at least one of the accessories, such as the outlet shaft of the drive motor of the wiper device and/or a control element of the opening of the opening panel, is accessible from the exterior of the vehicle across from an opening pierced in an outer cladding of the opening of the vehicle or across from a window;

an accessory comprises an electronic vision system, in particular, a camera which is oriented towards the exterior of the vehicle and which furnishes representative information of the exterior environment situated opposite the electronic vision system;

the representative information of the exterior environment is treated by a treatment system, that is transmitted to a display device on board the vehicle which furnishes a representative image of the exterior environment opposite the electronic vision system;

the representative information of the exterior environment is furnished to a treating system which determines at least one parameter relative to an object in the exterior environment, such as the relative speed or the distance between the object and the vehicle;

the object is another vehicle;

the electronic vision system is situated in the interior of the vehicle cabin opposite from a transparent wall borne by the opening panel, such as a window;

the electronic vision system is in the interior of the opening panel structure, and an opening is pierced in an outer cladding of the opening in order to allow viewing of the electronic vision system;

the interior door trim element is in the form of a rectangular plate, the central part of which comprises an attachment zone of at least one accessory which is made up of at least one partition demarcating at least one chamber designed to receive at least one accessory.

BRIEF DESCRIPTION OF THE DRAWING

Other characteristics and advantages of the invention will appear in the reading of the detailed description which follows, for the comprehension of which one will refer to the attached drawings in which.

DETAILED DESCRIPTION

In the following description, in order to facilitate its comprehension, one will use, in a non-limiting manner, the terms horizontal, lower, upper, front, and rear in reference to FIG. 1, in particular, to its orientation from right to left.

In the following description, identical or similar elements will be designated by the same reference numbers.

Figure 1:
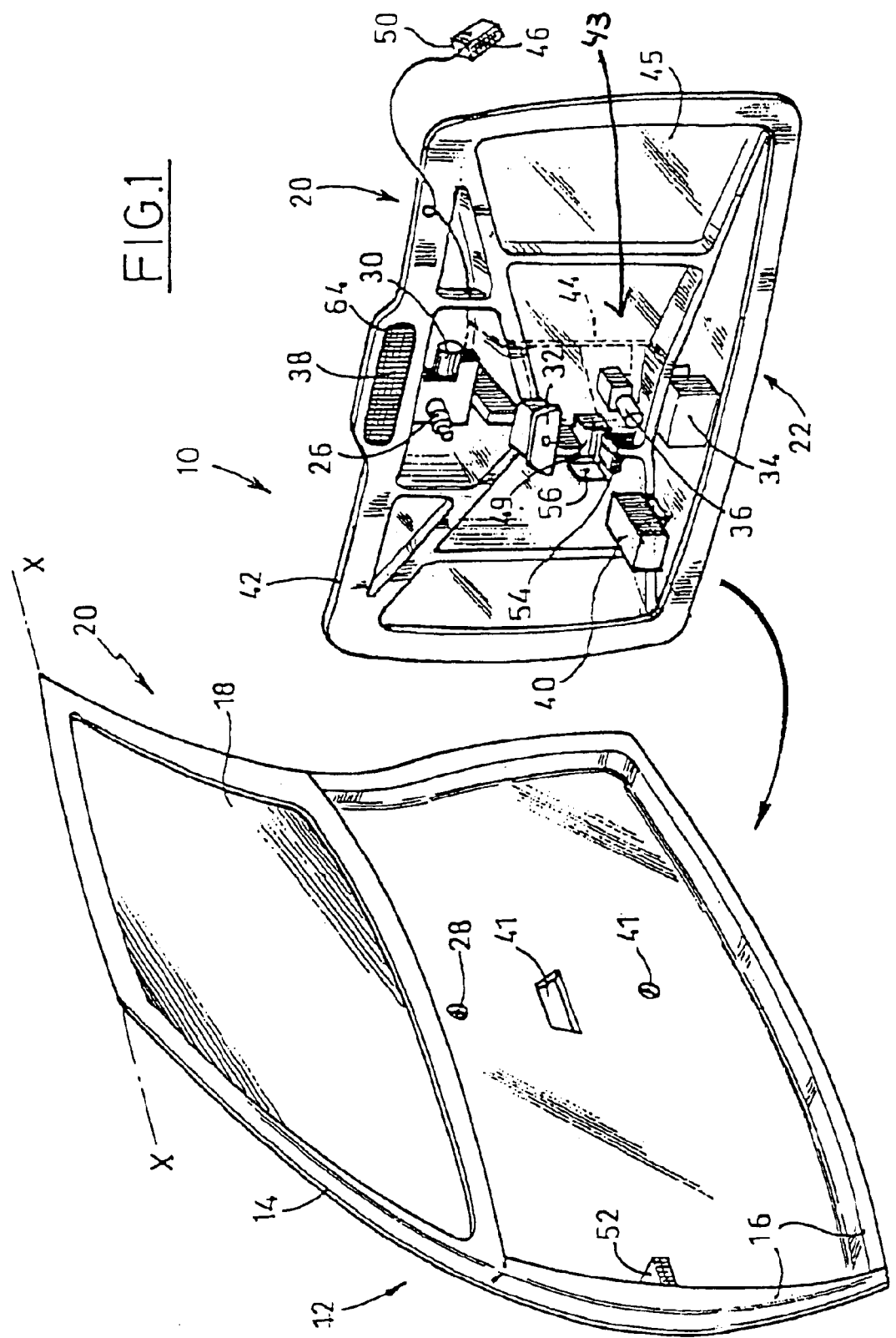
FIG. 1 is an exploded perspective view of a rear opening panel and an equipment module according to a first production method of the invention.

FIG. 1 represents the rear part 10 of a motor vehicle and, more specifically, a rear opening panel or rear hatchback.

The rear opening panel 12 comprises an outer cladding or body 14 which is reinforced on its front face oriented towards the interior of the vehicle via jambs 16. The rear opening panel 12 is mobile in rotation around an axis X, here horizontal, between an open position and closed position.

A window or rear window 18 is mounted in an opening situated in the upper part of the opening panel 12.

The rear opening panel 12 is also made up of a door trim element 42 of the interior of the trunk or the cabin of the vehicle which is assembled on the lower part of the opening panel 12. The door trim element 42 assures the aesthetics of the unit of the interior of the vehicle.

A structural element 20 bears equipment accessories of the motor vehicle, the ensemble thus created being called the equipment module 22 of the vehicle. The module 22 is received on the lower part of the opening panel 12. The structural element 20 bears a wiper device for the wiping of the rear window 18, the drive head of which is borne by a drive shaft 24 supported by a bearing or shaft 26 which crosses a passage aperture 28 formed in the outer cladding 14 or in an opening formed in the window 18 while the structural element 20 is attached onto the rear opening panel 12.

The equipment module 22 of the rear opening panel of the motor vehicle here comprises other accessories, in particular, a motor or reduction motor 30 of the drive shaft 24 of the wiper device, light sources, an opening handle 32 of the opening panel 12, as well as an optic electronic vision system 36, such as a camera. Here, the light sources consist of a rear signal light, such as a signal light for braking called a brake light 38, and a light block 40 of the interior of the cabin and/or trunk of the vehicle.

Also, the locking device 34 is electrically controlled via the opening handle 32 of the opening panel 12.

In FIG. 1, the lighting block 40 is shown disassembled from the structural element 20.

The light sources can also consist of a turn signal, a reverse light, and/or an anti-fog light. A light source can also comprise a light block (not represented) for the vehicle's exterior, such as a light block for the license plate.

In order for the opening handle 32 of the opening panel 12 as well as the optical electronic vision system 36 to be accessible from the exterior of the vehicle, the openings 41 are pierced in an outer cladding 14 of the opening panel 12 of the vehicle.

According to the invention, the structural element 20 is made up of the door trim element 42 of the interior of the trunk or the cabin of the vehicle.

FIG. 1 represents the rear opening panel 12 before the door trim element 42 according to a first production method is assembled. The door trim element 42 is in a rectangular form, the central part of which comprises an attachment zone 43 for accessories. In this way, the brake light 38, the light block 40 and the motor 30 are mounted on only one piece made up of the interior door trim element 42 of the trunk or the cabin of the vehicle.

The assembly of the equipment module 22 is thus simplified in relation to the state of the art. In effect, the module 22 comprises one single piece first assuring the aesthetics of the unit of the interior of the vehicle and, second, the support of the accessories.

The interior door trim element 42 comprises on its rear wall 45 rigidity elements. The interior door trim element 42 is produced via molding an electrically insulating material, for example a plastic material.

Figure 2:
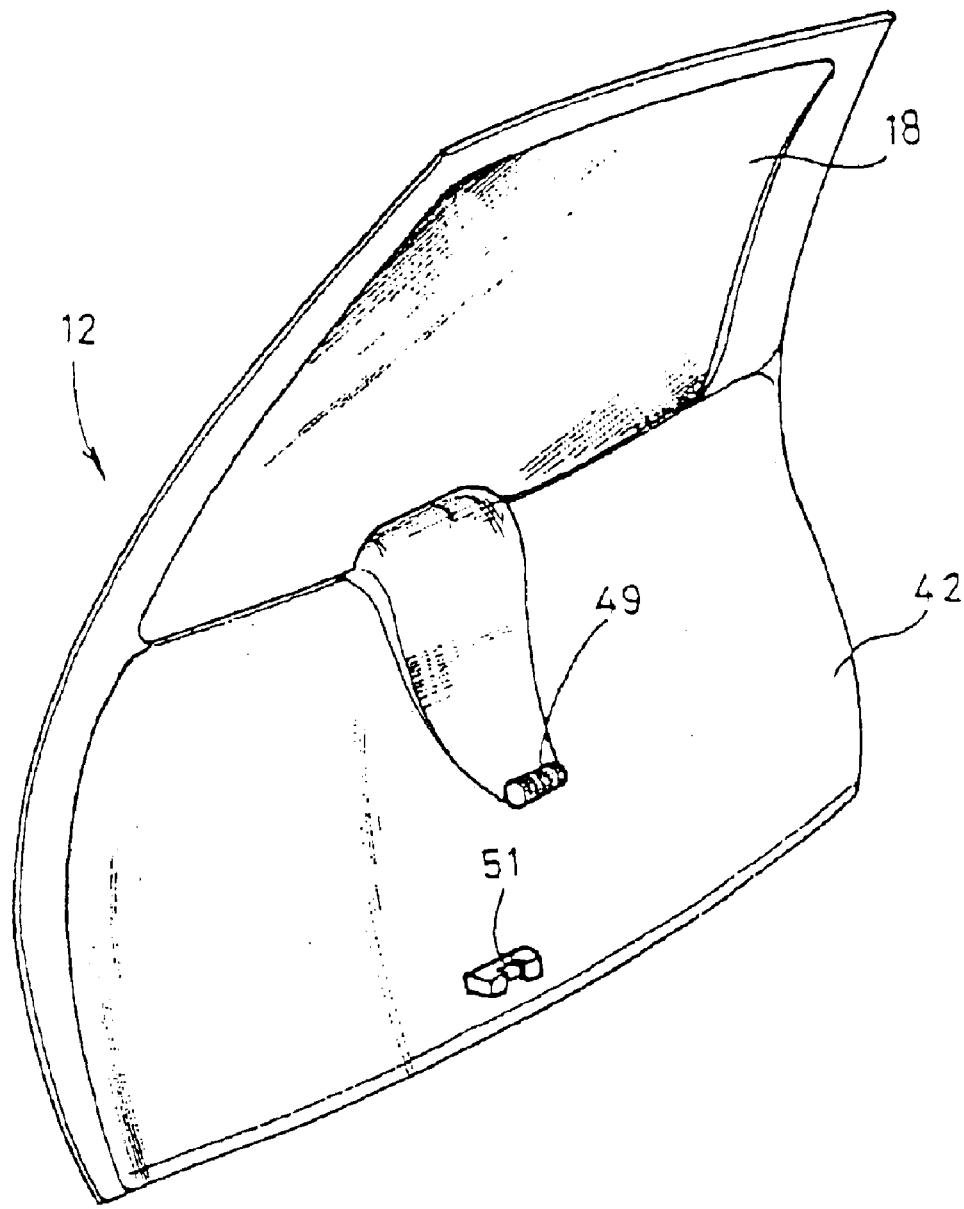
FIG. 2 is a perspective view, similar to that represented in FIG. 1, depicting the equipment module being mounted on the rear opening panel.

An opening 49 represented in FIGS. 1 and 2, is produced in the interior door trim element 42 in such a way that the luminous face of the light block 40 crosses the interior door trim element 42 to light the interior of the cabin and/or the trunk of the vehicle.

In a similar manner, an opening 51 allows the passage of, first, the hanging part of the locking device 34 of the opening panel 12 across the interior door trim element 42. The hanging part allows the locking of the rear opening panel 12, in a closed position, onto a complementary zone opposite the structure of the vehicle.

The interior door trim element 42 is advantageously molded around at least one lead or cable 44 (represented by dotted lines in FIGS. 1 and 3) in an electrically conductive material so that the electric power supply of the accessories borne by the structural element 20, such as the drive motor 30, the brake light 38, the light block 40 of the interior of the cabin and/or the trunk of the vehicle, and the locking device 34 is provided.

The leads 44, which can comprise conductive metal bands, also allow the exchange of signals between the accessories and an electric or electrical device (not represented) which can comprise surveillance means of the accessories. The conductive leads 44 can be produced in different materials or comprise different sections according to the magnitude of the current that each carries. In effect, the section of a conductive lead 44 and/or the nature of the material making it up can be different according to whether it supplies the power circuit of the motor 30 or if it permits the exchange of signals between the accessories and an electric device. The utilization of such conductive leads 44 embedded in the interior door trim element 42 is viable, very economical and simple to put into place.

An electric connector 46 allows electrical supplying power to the accessories. Here, it is linked to two leads 44 via an electric thread 48.

According to a production variation, the body of the electric connector 46 can be molded with the interior door trim element 42. The electric connector 46 comprises conductive elements 50 which are electrically linked to a first end of the electric power supply leads 44 of the accessories, here via the thread 48.

While the accessories are assembled onto the equipment module 22, it is easy to verify the functioning, via the electric connector branching 46, onto a complementary test connector. Eventual disfunctions are thus quickly and easily detected.

During the mounting of the equipment module 22 in the rear opening panel 12 of motor vehicle, the electric connector 46 cooperates with a complementary electric connector 52 which is attached onto the rear opening panel 12 and which permits the electric power supply of the leads 44 and the accessories from the general electric current of the vehicle. The electric connectors 46 and 52 thus allow assurance the exchange of signals between the accessories and electric or electronic devices of the vehicle.

In addition, the electric connection of all of the accessories is obtained via branching of the only electric connector 46. This allows optimization of assembly time of the equipment module 22 of the opening panel 12.

In a similar manner, the interior door trim 42 comprises an electric power supply connection 54 for each of the electric accessories of the equipment module 22. The body of the connections 54 of preferably molded with the interior door trim element 42. Each accessory comprises a connection complementary to each connection 54 of the interior door trim element 42 which permits electrically linking each accessory to an electric power supply lead 44.

The interior door trim element 42 comprises, in addition, the elements for mounting and/or attachment of the accessories. The elements 56 consist, for example, of a system of elastic fitting. Mounting screws can be added, in such a way as to remove all risk of accidental removal of an accessory. Such an element 56 of a mounting and/or attachment type of accessories allows facilitating the assembly of the equipment module 22, and by consequence, diminishing its time and cost.

Advantageously, the electric power supply connections 54 as well as the mounting and/or attachment elements 56 of the accessories are identical. The electric connection as well as the mounting and/or attachment of the accessories onto the interior door trim element 42 are standardized.

It is thus possible to easily assemble onto the interior door trim element 42 a different accessory, according to the equipment level of the vehicle.

The interior door trim element 42 integrates of mounting and/or attachment elements 56 of the accessories, as well as the leads 44 and the electric power supply connections 54 of the accessories. It can also integrate the electric connector 46. Such a door trim element 42 facilitates the assembly of the accessories of the module 22.

In order to assure an optimal efficiency of the rear signal light 38, that is to say, emission of a maximum of light towards the exterior of the vehicle, it is preferable to block dust from entry between the interior face of the window 18 and the rear signal light 38. To this effect, the rear signal light 38 is preferably pushing against the interior face of the rear window 18 borne by the rear opening panel 12 of the motor vehicle. In addition, an annular-shaped joint 64 is interposed between the periphery of the light 38 and the interior face of the window 18 in such a way as to assure water tightness.

However, the dimensional tolerance of the different pieces, in particular, the position of the attachment of the equipment module 22 onto the outer cladding 14, is sometimes too significant to assure the joint contact 64 with the interior face of the window 18. In this way, so that the joint contact 64 is always in contact with first the periphery of the rear signal light 38 and with the interior face of the window 18, the equipment module 22 comprises regulating means, not represented, the longitudinal position of the signal light 38.

It is possible to interpose a spring between the interior door trim element 42 and the signal light 38. Thus, while the equipment module 22 is attached onto the rear opening panel 12, the spring allows permanent application on the front face of the signal light 38 of a longitudinal force in the direction of the window 18.

The optical electronic vision system 36 is oriented towards the rear of the vehicle. It furnishes representative information of the exterior environment situated across from it. In order to protect the electronic vision system 36, in particular, from dirt and the projection of elements, such as gravel, a transparent protection hood, not represented, is attached between the exterior of the vehicle and the electronic vision system 36.

A shock absorbing element, also not represented, can be interposed between the electronic vision system 36 and the interior door trim element 42 in order to absorb vibrations of the rear opening panel in such a way such that the electronic vision electronic 36 is in the most stable possible position and furnishes to the user precise information.

During the assembly of the equipment module 20 with the rear opening panel 12, the water tight seal at the level of the opening 41 corresponding to the outer cladding 14 of the rear opening panel 12 is obtained by arrangement of a joint, not represented, in a circular shape in a groove created for this purpose in a rear side support of the protection hood. Thus, during the attachment of the equipment module 22 onto the rear opening panel 12, the joint is squeezed between the front face of the outer cladding 14 and the groove of the protection hood.

The embedded leads 44, to which the electronic vision system 36 is electrically attached, permit the supply of electric power to it, but also permit it to transmit representative information of the exterior environment to a treating system, which then transmits treated information to a display device on board the vehicle.

The display device furnishes a representative image of the exterior environment opposite the electronic vision system 36. Thus, the display device such as a control screen, furnishes to the driver a view of the environment found at the rear of the vehicle. Such an electronic vision system 38 associated with the display device permits, for example, replacement of the interior rear-view mirror of the vehicle.

The treatment system can also determine a parameter relative to an object in the exterior environment. The object can be another stopped or moving vehicle.

The parameter can be the relative speed or distance between the object and the vehicle. The electronic vision system 36 allows, in this way, helping the driver during a maneuver, in particular, during parallel parking, by indicating to him the distance that separates the rear end of his vehicle and the object situated at the rear of the vehicle.

According to a variant, the electronic vision system 36 can be received in the casing of the brake light 38.

According to another variant, an accessory comprises a rain and/or frost and/or dirt sensor which allows detection of the presence of rain and/or frost on the external face of the outer cladding 14 and/or the window 18. The rain and/or frost sensor can be assembled onto the interior door trim element 42 in the place of the electronic vision system 36 or at a different place not represented.

Figure 3:
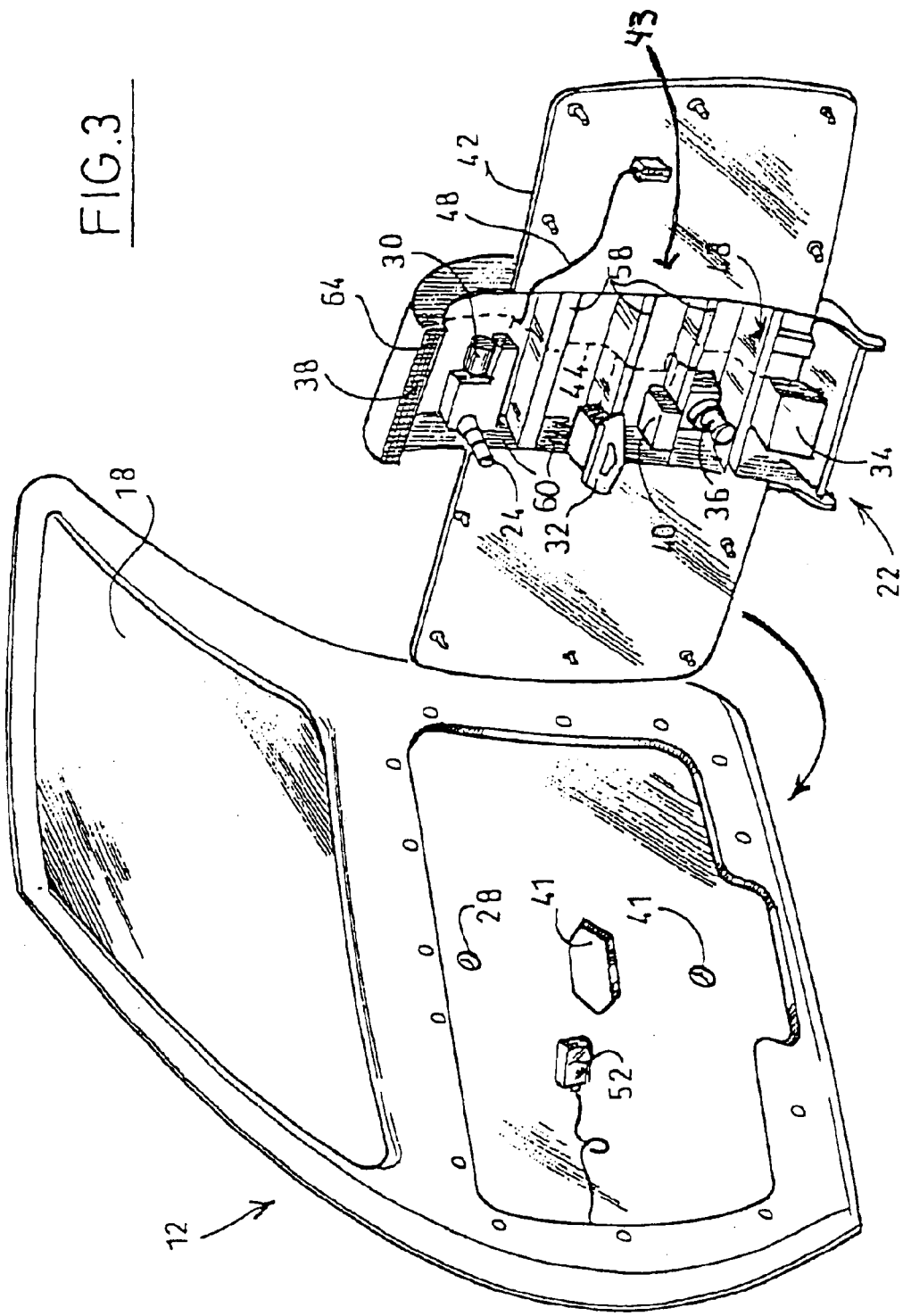
FIG. 3 is a view similar to that represented in FIG. 1, the equipment module being produced according to a second production method of the invention.

According to a second production method represented on FIG. 3, the attachment zone 43 comprises a partition 58 that demarcates the chambers 60 designed to receive the accessories. In addition to separating the accessories between them, the partitions 58 allow rigidifying the interior door trim element 42.

The invention allows the use of a unique type of interior door trim element and assembly of the accessories as a function at the level of the equipping of the constructed vehicle. The stocking, development, and production costs of the interior door trim element 42 are thus significantly diminished.

What is claimed is:

1. An equipment module for a motor vehicle opening panel formed of an interior door trim element and an outer cladding including a structural element whereon are directly mounted accessories internal to the opening panel, characterized in that the structural element is the inner door trim, and further characterized in that the interior door trim element is formed of an electrical insulating material and mounted around of at least one lead in an electrically conductive material for an electric power supply, at least one accessory borne by the interior door trim element, and for the exchange of signals with the door trim element.

2. The equipment module according to claim 1, characterized in at least one electric power supply connector of the module, a connector body of which is molded with the interior door trim element and which is electrically linked to a first end of at least one electric power supply lead.

3. The equipment module according to claim 2, characterized in only one power supply connect exists for all the electric power supply leads of the module.

4. An equipment module for a motor vehicle opening panel formed of an interior door trim element and an outer cladding including a structural element whereon are directly mounted accessories internal to the opening panel, characterized in that the structural element is the inner door trim, and further characterized in that at least one electric power supply connection exists for at least one accessory, a connector body of which is molded with the interior door trim element and which is electrically linked to a second end of at least one electric power supply lead of the at least one accessory.

5. The equipment module according to claim 4, characterized in that at least one mounting element of at least one accessory is molded with the interior door trim element.

6. An equipment module for a motor vehicle opening panel formed of an interior door trim element and an outer cladding including a structural element whereon are directly mounted accessories internal to the opening panel, characterized in that the structural element is the inner door trim, and further characterized in that one of the accessories comprises a light source.

7. The equipment module according to claim 6, characterized in that the light source comprises a light block for the interior of one of a cabin and a trunk of the vehicle.

8. The equipment module according to claim 6, characterized in that the light source comprises a rear signal light, in particular a brake light, a turn signal, a reverse light or an anti-fog light, or part of such a light.

9. The equipment module according to claim 8, characterized in that the rear signal light is pushed against the interior face of a rear window borne by a rear opening panel of a motor vehicle.

10. The equipment module according to claim 8, characterized in that the interior door trim element comprises regulating means for the position of the rear signal light in relation to one of the interior face of the rear window and of an opening in the outer cladding of an opening panel.

11. The equipment module according to claim 6, characterized in that the light source comprises a light block for the exterior of the vehicle.

12. An equipment module for a motor vehicle opening panel formed of an interior door trim element and an outer cladding including a structural element whereon are directly mounted accessories internal to the opening panel, characterized in that the structural element is the inner door trim, and further characterized in that an accessory comprises a drive motor for a wiper device.

13. The equipment module according to claim 12, characterized in that an accessory comprises a control element for the opening of the opening panel.

14. The equipment module according to claim 12, characterized in that an accessory comprises a locking element for the opening of the panel.

15. The equipment module according to claim 12, characterized in that at least one of the accessories is accessible from the exterior of the vehicle across from an opening formed in the outer cladding of the opening panel of the vehicle across from a window.

16. An equipment module for a motor vehicle opening panel formed of an interior door trim element and an outer cladding including a structural element whereon are directly mounted accessories internal to the opening panel, characterized in that the structural element is the inner door trim, and further characterized in that an accessory comprises an electronic vision system, which is oriented towards the exterior of the vehicle and which furnishes representative information of the exterior environment situated opposite from the electronic vision system.

17. The equipment module according to claim 16, characterized in that the representative information of the exterior environment is treated by a treating system and transmitted to a display device in the vehicle which furnishes a representative image of the exterior environment opposite from the electronic vision system.

18. The equipment module according to claim 16, characterized in that the representative information of the exterior environment is furnished to a treating system which determines at least one parameter relative to an object in the exterior environment.

19. The equipment module according to claim 18, characterized in that the object is another vehicle.

20. The equipment module according to claim 16, characterized in that the electronic vision system is disposed in the interior of a cabin of the vehicle opposite from a transparent opening carried by the opening panel.

21. The equipment module according to claim 16, characterized in that the electronic vision system is disposed in the interior of the opening panel structure, and in that an opening is formed in the outer cladding of the opening panel in order to view the electronic vision system.

22. An equipment module for a motor vehicle opening panel formed of an interior door trim element and an outer cladding including a structural element whereon are directly mounted accessories internal to the opening panel, characterized in that the structural element is the inner door trim, and further characterized in that the interior door trim element is in the shape of a rectangular plate, a central part of which comprises a mounting zone of at least one accessory which comprises at least one partition demarcating at least one chamber designed to receive the at least one accessory.

23. The equipment module of claim 9, characterized in that the rear signal light is pushed against one of the interior face of the rear window and the contour of the opening of an outer cladding by interposition of a joint.

* * * * *